May 26, 1959 W. F. SCHMITT 2,888,667

SHIFTING REGISTER WITH PASSIVE INTERMEDIATE STORAGE

Filed Jan. 24, 1955

INVENTOR

WILLIAM F. SCHMITT

BY William Goldman

AGENT 2,888,667

SHIFTING REGISTER WITH PASSIVE INTERMEDIATE STORAGE

William F. Schmitt, Wayne, Pa., assignor to Sperry Rand Corporation, New York, N.Y., a corporation of Delaware Application January 24, 1955, Serial No. 483,780

14 Claims. (Cl. 340—174)

The present invention relates to shifting registers and is more particularly concerned with such devices employing magnetic amplifiers. In particular, the present invention comprises an improved shifting register employing passive storage between the plural register stages.

The shifting register comprises a basic component in many present-day computing apparatuses. Such registers are used, for instance to obtain a physical translation of information signals within a computing apparatus, or they may be obtained for effecting a predetermined or variable delay within a computing device. In the past, shifting registers of the type described have normally utilized vacuum tube circuitry and the use of such circuitry has been accompanied by the disadvantages that the shifting register has been relatively large in size, has been subject to breakage, and to normal operating failures. These foregoing factors have raised serious questions in respect to the disposition of components, as well as in respect to maintenance and the cost attendant thereto.

In order to obviate the foregoing difficulties, other forms of electrical devices have been suggested for use in shifting registers, and one such other form is the magnetic amplifier. It is with this particular type of component that the present invention is primarily concerned. In addition, and as is further well known, it is often desired to effect a predetermined delay between successive stages of a shifting register. When a shifting register comprising magnetic amplifiers is employed, such a delay may be employed to reduce the need for plural sources of power pulses of differing phases. The present invention effects the foregoing delay or storage between successive stages through the medium of passive storage elements such as capacitors.

It is accordingly an object of the present invention to provide a novel shifting register utilizing magnetic amplifiers as basic components thereof.

A further object of the present invention resides in the provision of a shifting register comprising a plurality of amplifier stages utilizing passive storage between the several stages.

A further object of the present invention resides in the provision of a shifting register which is both inexpensive to construct and which exhibits considerable ruggedness.

Still another object of the present invention resides in the provision of a shifting register which may be made in relatively small sizes.

A still further object of the present invention resides in the provision of a shifting register utilizing pulse type magnetic amplifiers in combination with capacitive intermediate storage means.

The foregoing objects are achieved in the present invention by providing a shifting register comprising a plurality of magnetic amplifiers coupled to one another in cascade by means which include a capacitive store. In a preferred embodiment of the present invention, the magnetic amplifiers are of the type known as complementing magnetic amplifiers, and in this respect, a complementing amplifier is by definition one which will give an output when no input is presented thereto, or on the contrary, one which gives no output when there is in fact an input thereto. In practice, and in the absence of a signal input to a shifting register utilizing such complementing amplifiers, the odd stages of the said shifting register are caused to be in an output producing state while the even stages of the said shifting register, due to the effect of the intermediate capacitive storage, are in a non-output producing state. The application of a signal input to the first magnetic amplifier stage of my shifting register causes the output of that first stage to be changed during the next succeeding power pulse and, as will become apparent from the following discussion, this change, through the action of the several capacitive storage means utilized, is shifted down the chain of magnetic amplifiers comprising the novel shifting register of the present invention.

The shift is effected from one stage of the shifting register, in accordance with the present invention, to the next succeeding stage during the application of successive power pulses applied to the several stages, and by this arrangement therefore the said power pulses in fact provide a means of control over the shifting of the input information. Thus, an input pulse applied to the first stage of the shifting register causes a change in the output state of that first stage during the next succeeding power pulse. This change in output condition is transferred to the second stage of the said shifting register during the second succeeding power pulse, etc. If the said power pulses are applied to the several magnetic amplifiers comprising my shifting register in a regularly occurring train of pulses appearing during successive time periods, the application of an input pulse to one of the stages in the shifting register will be evidenced by a change in output state of the several successive magnetic amplifier stages respectively during successive time periods subsequent to the application of the said signal input.

The foregoing objects, advantages, construction and operation of the present invention will become more readily apparent from the following description and accompanying drawings, in which.

Figures 1, 2:
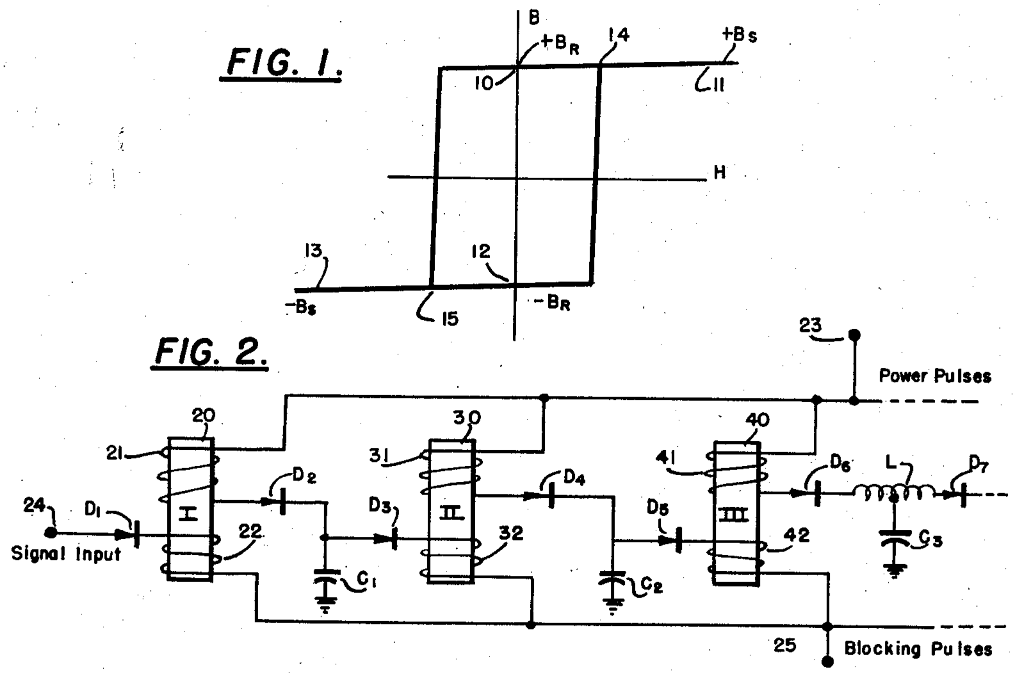
Figure 1 is an idealized hysteresis loop of a magnetic material which may preferably be employed in the cores of the magnetic amplifiers utilized in the shifting register of the present invention.
Figure 2 is a schematic representation of three stages of a shifting register utilizing magnetic amplifiers and capacitive intermedate storage in accordance with the present invention.

Referring now to Figure 1, it will be seen that the magnetic amplifiers utilized in the practice of the present invention may preferably, but not necessarily, utilize magnetic cores exhibiting a substantially rectangular hysteresis loop. Such cores may be made of a variety of materials, among which are the various types of ferrites and various kinds of magnetic tapes, including Orthonik and 4–79 Moly-Permalloy. These materials may be given different heat treatments to effect different desired properties. In addition to the wide variety of materials applicable, the cores of the said magnetic amplifiers may be constructed in a number of different geometries including both closed and open paths. For example, cup-shaped cores, strips of material, or toroidal cores are possible. It must be emphasized, however, that the present invention is not limited to any specific geometries of its cores nor to any specific magnetic materials therefor. Neither the precise core configuration nor the precise hysteretic character of the core material to be discussed is mandatory and many variations will readily suggest themselves to those skilled in the art.

Returning now to the hysteresis loop shown in Figure 1, it will be seen that the said loop exhibits several significant points of operation, namely, the point 10 (+B*r*), which represents a point of plus remanence; the point 11 (+B*s*), which represents plus saturation; the point 12 (−B*r*), which represents minus remanence; the point 13 (−B*s*), which represents minus saturation; the point 14 which represents the beginning of the plus saturation region; and the point 15 which represents the beginning of the minus saturation region.

Discussing for the moment the operation of a device utilizing a magnetic core exhibiting a hysteresis loop such as has been shown in Figure 1, let us first assume that a coil is wound on the said core. If we should now further assume that the core is at its plus remanence operation point 10, and if a voltage pulse should be applied to the said coil which produces therein a current creating a magnetomotive force in a direction tending to increase the flux in the said core (i.e. in a direction of +H), the core will tend to be driven from its operating point 10 (+B*r*) to its operating point 11 (+B*s*). During this particular state of operation there is relatively little flux change through the said coil and the coil therefore presents a relatively low impedance whereby energy fed to the said coil will pass readily therethrough and may be utilized to effect a usable output.

On the other hand, if the core should initially be at its minus remanence operating point 12 prior to the application of such a +H pulse, upon application of such a pulse the core will tend to be driven from the said operating point 12 to the region of plus saturation. The pulse magnitude should preferably be so selected that the magnetic core is driven only to the beginning of the plus saturation region, namely, to the operating point 14. During this state of operation there is a relatively large flux change through the coil and the coil therefore exhibits a relatively high impedance to the applied pulse. As a result, substantially all the energy applied to the coil when the core is initially at −B*r* will be expended in flipping the core from its operating point 12 to the region of plus saturation (preferably to the operating point 14) and thence to the operating point 10, with very little of this energy actually passing through the said coil to give a usable output. Thus, depending upon whether the coil is initially at its plus remanence operating point 10 or at its minus remanence operating point 12, an applied pulse in the +H direction will be presented respectively with either a low impedance or a high impedance and will effect either a relatively large output or a relatively small output. These considerations are of value in the construction of magnetic amplifiers such as may be utilized in the practice of the present invention.

Figure 3:
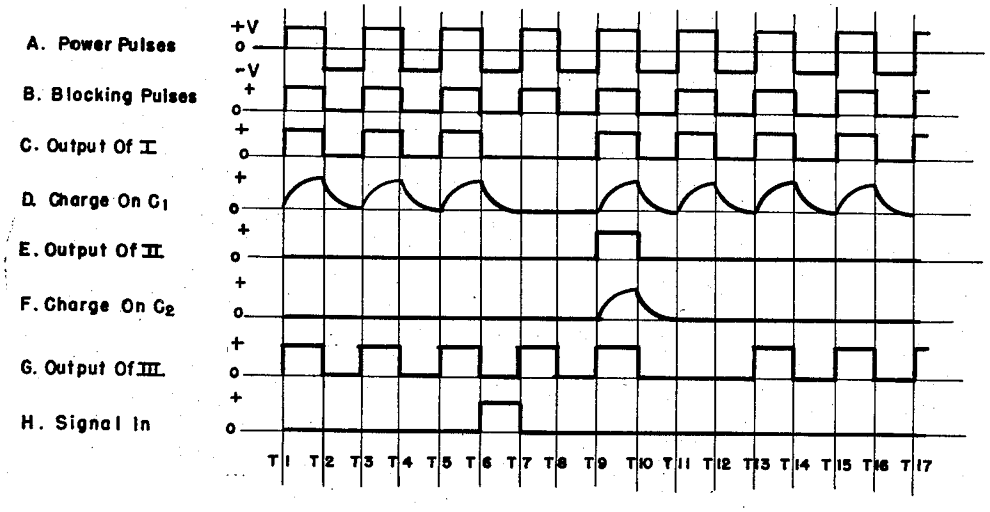
Figure 3 (A through H inclusive) are waveforms illustrating the operation of the shifting register shown in Figure 2.

Referring now to Figures 2 and 3, it will be seen that a shifting register in accordance with the present invention utilizes a plurality of cascade-connected magnetic amplifiers. Three stages of the shifting register utilizing such magnetic amplifiers have been shown in Figure 2 and these stages comprise respectively the magnetic amplifiers identified as I, II and III. As will be discussed more fully subsequently, each of the amplifiers I, II and III, etc. includes a core, a power or output winding thereon coupled at one of its ends to a source of regularly occurring power pulses, and a signal or input winding thereon coupled at one of its ends to a source of regularly occurring blocking pulses. The function of these pulses will become apparent as the present description proceeds. Each of the magnetic amplifiers is in effect a complementing amplifier and the several amplifier stages are interconnected by buffer means and by storage or delay means which are preferably capacitive in nature.

Referring to the magnetic amplifier designated I, let us briefly examine the construction and operation thereof, it being understood that the operation of each of the several further amplifier stages is precisely the same. Magnetic amplifier I comprises a core 20 preferably but not necessarily exhibiting a hysteresis loop similar to that discussed in reference to Figure 1. The core 20 carries two windings thereon, namely, a winding 21 which is termed the power or output winding, and a winding 22 which is termed a signal or input winding. By the same token, each of the magnetic cores II, III, etc. carries respectively a power or output winding 31, 41, etc. and a signal or input winding 32, 42, etc. on its core 30, 40, etc.

One end of power winding 21, for instance, is coupled to a terminal 23 which terminal is supplied with a train of positive and negative going power pulses such as has been shown in Figure 3A. In the particular embodiment shown, these power pulses preferably exhibit excursions between plus and minus V volts. The other end of the power or output winding 21 is coupled via a diode D2 to the upper terminal of a capacitor C1; and the output of the said amplifier I selectively appears at the said upper terminal of capacitor C1 via the said diode D2. The lower terminal of capacitor C1 is returned to ground as shown and the upper end of the said capacitor C1 is further coupled via a diode D3, poled as shown, to one end of the next succeeding signal winding 32 carried by the core 30. It should be noted that the diode D2 (and the corresponding diode in any of the other stages) may in fact be coupled between the upper end of the power winding and the terminal 23, rather than between the lower end of the said power winding and the capacitive store. When reference is made to the "junction point" between diodes D2 and D3, for instance, this latter configuration is meant to be included in the terminology used.

Returning now to the construction of amplifier I, it will be further seen that the signal or input winding 22 is coupled at one of its ends via a diode D1 to an input terminal 24, to which input terminal may be coupled selective input signals which are to be shifted down the shifting register in accordance with the present invention. The lower end of signal or input winding 22 (as well as of signal or input windings 32, 42, etc.) is coupled to a terminal 25 supplied with a train of positive going blocking pulses such as are shown in Figure 3B. The blocking pulses coupled to terminal 25 are preferably positive going from a base level of zero volts and, as will be seen from a comparison of Figures 3A and 3B, a positive going blocking pulse coincides with a positive going power pulse at each of the amplifier stages.

Examining now the operation of the magnetic amplifier I, without reference to the remaining amplifier stages comprising the shifting register of the present invention, let us assume that the core 20 is initially at its plus remanence operating point 10. A positive going power pulse applied at the input terminal 23 during the time *t*1 to *t*2, for instance (Figure 3A), will cause current to pass through the power or output winding 21 and thence through diode D2 to the output point of the said amplifier I. Inasmuch as the power winding 21 exhibits a relatively low impedance for this state of operation, an output pulse will appear at the said output point and will be developed across the capacitor C1 to ground, charging the said capacitor with a polarity positive at the top and negative at the bottom thereof during the application of a positive going power pulse. At time *t*2, and in the absence of any signal input, the core 20 will return to its operating point 10 (+B*r*), and during the time interval *t*2 to *t*3 a negative going power pulse will be applied to the winding 21 in coincidence with the removal of the positive blocking pulse which was applied during time interval t1 to t2, via the terminal 25 and the winding 32 to the cathode of diode D3. During the time interval *t*2 to *t*3 therefore the capacitor C1 will tend to discharge through diode D3 and winding 32 into the source of blocking pulses coupled to terminal 25.

During the next positive going power pulse, applied during the time interval $t3$ to $t4$, for instance, a positive going blocking pulse will once more be applied from the terminal 25 to the cathode of diode D3 causing the said diode D3 to be cut off. The application of the said next positive going power pulse will once more cause core 20 to be driven from its $+Br$ operating point 10 to plus saturation, again giving an output during the time interval $t3$ to $t4$ and charging the capacitor C1 during the said time interval $t3$ to $t4$. Thus, in the absence of any other inputs, and assuming the core 20 to be initially at its plus remanence operating point 10, successive positive going power pulses will cause successive outputs to appear at the output terminal of the said amplifier I.

If we should now assume that an input pulse is coupled from the terminal 24 via diode D1 to the signal or input winding 22 during a time interval $t6$ to $t7$ for instance (Figure 3H), this input pulse will effect a current flow through the diode D1 and the winding 22 to the source of blocking pulses coupled to terminal 25. During the time interval $t6$ to $t7$ the potential of the said terminal 25 is, as may be seen from an examination of Figure 3B, substantially at ground. Inasmuch as signal or input coil 22 is effectively wound in a direction opposite to that of power or ouput winding 21, the said input pulse during time interval $t6$ to $t7$ will effect a $-H$ magnetizing force on the core 20 and this magnetizing force will cause the said core 20 to be flipped in a counterclockwise direction about its hysteresis loop from its plus remanence operating point 10 to its operating point 15 and thence to its minus remanence operating point 12. Thus, at the time $t7$, for instance, the core 20 will find itself to be at its minus remanence operating point 12 preparatory to the reception of the next positive going power pulse. The application of this next positive going power pulse during the time $t7$ to $t8$, for instance, will find the coil 21 to present a relatively high impedance and, as a result, substantially all the energy presented by the said power pulse will be expended in merely flipping core 20 back to the region of its operating point 10 via its operating point 14, rather than in producing a usable output.

Thus, as will be seen from an examination of Figure 3, the magnetic amplifier I, for instance, will, in the absence of an input pulse, produce a series of output pulses occurring respectively during the application of positive going power pulses applied thereto. The application of an input pulse during the occurrence of a negative going portion of the applied power pulses, however, will effectively prevent the output of a usable pulse during the next suceeding positive going pulse period. The magnetic amplifier I (as well as the magnetic amplifiers II, III, etc.) thus acts as a complementer. The effect discussed above can be generalized by stating that complementing magnetic amplifiers of the type utilized in the practice of the present invention will, in the absence of a signal input, produce an output pulse during the application of a positive going power pulse thereto. The output of such a complementing amplifier will, however, be inhibited during a selected positive going power pulse if an input pulse should be applied to the signal winding thereof during a time interval next preceding the application of the said positive going power pulse.

As has been discussed previously, a source of blocking pulses is applied to the terminal 25 and thence to the lower ends of each of the signal or input windings 22, 32, 42, etc. The blocking pulses so applied are positive going from a base level of zero volts and the said positive going pulses occur respectively during the application of positive going power pulses via the terminal 23. The blocking pulses thus applied to terminal 25 serve a dual function. As has been mentioned previously, and as will be discussed in greater detail subsequently, the said blocking pulses prevent the several capacitive storage means from discharging through the signal or input winding of a given magnetic amplifier during the output producing time periods of the several magnetic amplifiers. Further, the passage of energy through the several power windings 21, 31, 41, etc. due to the application of a positive going power pulse from the terminal 23, will cause a flux change to occur in the corresponding magnetic core whether the said core is being driven from its plus remanence operating point 10 to its plus saturation operating point 11, or from its minus remanence operating point 12 to its plus remanence operating point 10, during the application of the said positive going power pulse. These flux changes will in turn tend to induce voltages in the several signal windings 22, 32, 42, etc. Current is prevented from flowing in the said signal windings due to these induced voltages, however, by the action of the blocking pulses applied from terminal 25 and occurring in coincidence with positive going power pulses applied to the several power or output windings.

Let us now discuss in somewhat greater detail the operation of the shifting register shown in Figure 2. As has been discussed previously, the said shifting register comprises a plurality of complementing magnetic amplifiers, the operation of each of which has already been discussed, in conjunction with intermediate capacitive storage means comprising respectively a plurality of capacitors C1, C2, C3, etc. As has been discussed, the output winding 21 of amplifier I is coupled to the upper end of capacitive storage means C1, and the said storage means C1 is in turn coupled via a further diode D3 to the signal winding 32 of amplifier II and thence to the source of blocking pulses applied to terminal 25. Similarly, the output winding 31 of amplifier II is coupled via a diode D4 to the upper end of a capacitive storage means C2, and the said upper end of capacitive storage means C2 is further coupled via a diode D5 to the signal winding 42 of amplifier III and thence, to the source of blocking pulses applied to terminal 25. The output of amplifier III may be coupled to a still further stage by the arrangement of the diodes D6 and D7 and capacitive storage means C3, as shown, and in fact as many stages may be employed in the shifting register as are required by the particular application to be made of the said register.

Returning now to Figure 3, and assuming for the moment that no input pulses appear at the input terminal 24 of the first amplifier stage I, the said amplifier I will produce output pulses during the time intervals $t1$ to $t2$, $t3$ to $t4$, $t5$ to $t6$ (Figure 3C). During each of these time intervals, a positive going blocking pulse (Fig. 3B) is also applied to the lower end of each of the signal or input windings. By this arrangement therefore the application of a positive going output pulse during the time intervals $t1$ to $t2$, $t3$ to $t4$, etc. will cause the capacitor C1, for instance, to be charged to a positive potential during these time intervals, and the blocking pulses applied from terminal 25 during these same time intervals cause the diodes D3, D5, D7, etc. to be cut off whereby no current may flow through the several signal or input windings. During the time intervals $t2$ to $t3$, $t4$ to $t5$, etc., the output pulse from amplifier I, for instance, appearing via diode D2, will cease. During these same time intervals $t2$ to $t3$, $t4$ to $t5$, etc., the blocking pulses applied to terminal 25 return to their zero potential base level, and as a result any charge stored in the capacitors C1, C2, C3, etc. will cause a current to flow through the diodes D3, D5, D7, etc. through the signal or input winding 32, 42, etc. as the said capacitors discharge.

By the foregoing arrangement therefore the application of a positive going power pulse to the winding 21 of the amplifier I during a time interval $t1$ to $t2$ causes the said amplifier to produce an output pulse during the said time interval $t1$ to $t2$ thereby charging the capacitor C1 to a positive potential. During the next succeeding time interval $t2$ to $t3$ the negative going portion of the applied power pulses causes the diode D2 to be cut off and the capacitor C1 will discharge through the diode D3 and signal or input winding 32 of amplifier II. The discharge current thus flowing through the signal or input winding 32 of amplifier II effectively acts as a signal input to the said amplifier II occurring during the application of a negative going power pulse to the said amplifier II. Amplifier II will therefore be prevented from producing an output during the next succeeding positive going power pulse occurring, for instance, during the time interval $t3$ to $t4$. The failure of amplifier II to produce an output during these positive going power pulses prevents any charge from being developed across the capacitor C2 whereby there is effectively no signal input to the amplifier III during the application of negative going power pulses applied thereto and the amplifier III will produce successive output pulses in coincidence with positive going power pulses applied thereto. Thus, so long as amplifier I is in an output producing state the amplifier II will have signal input thereto during the proper time periods and will therefore be in a non-output producing state. The lack of outputs from amplifier II will therefore cause there to be a lock of signal inputs to the amplifier III and this further amplifier stage will therefore be in an output producing state. Summarizing therefore, in the absence of any signal input at the input terminal 24, each of the odd amplifier stages I, III, etc. will be in an output producing state while each of the even amplifier stages II, etc. will be in a non-output producing state.

If we should assume once more that a signal input is applied to the terminal 24 during the time interval $t6$ to $t7$ (Figure 3H), such a signal input will inhibit an output from the amplifier I during the time interval $t7$ to $t8$ (Figure 3C). This lack of output from amplifier I will prevent any charge from being stored in the capacitive storage means C1 and therefore there will be no current discharge from the said storage means C1. As a result of the inability of capacitor C1 to supply a discharge current no signal input will be applied to amplifier II during the time interval $t8$ to $t9$. Amplifier II will therefore not be inhibited and will, as a result, produce an output pulse during the time interval $t9$ to $t10$ which output pulse charges the capacitor C2, in accordance with the preceding discussion, during the said time interval $t9$ to $t10$. Capacitor C2 will be caused to discharge via diode D5 and winding 42 during the time interval $t10$ to $t11$ whereby the amplifier III will effectively have a signal input thereto during the said time interval $t10$ to $t11$, and as a result, amplifier III will produce no output pulse during the time interval $t11$ to $t12$. By analogy, it will be seen that this lack of output from odd stage III will permit an output from the next succeeding even stage, etc.

Thus, the application of an input pulse during the time interval $t6$ to $t7$ causes a change in the output state of amplifier I during the time interval $t7$ to $t8$; this change in turn causes a further change in the output state of the amplifier II during the time interval $t9$ to $t10$; this further change causes a still further change in the output state of amplifier III during the time interval $t11$ to $t12$, etc. In short, the application of an input pulse to a first amplifier stage of the shifting register, in accordance with the present invention, is characterized by a change in output condition of each of the subsequent amplifiers comprising the said shifting register and these changes in output condition occur for successive ones of said further amplifier stages during later and later time intervals in coincidence with successive ones of the applied positive going power pulses. The input pulse thus effectively proceeds down the chain of amplifier devices under the control of the applied power pulses whereby the overall arrangement acts as a shifting register and provides a delay effect to the input pulse, the amount of which delay is dependent upon the number of stages comprising the shifting register and the time of occurrence of the applied power pulses.

While I have described a preferred embodiment of the present invention, many variations will readily suggest themselves to those skilled in the art. Thus, while the present invention has employed magnetic amplifiers, the principles of intermediate storage discussed above may be utilized in shifting registers utilizing other forms of amplifiers such as electronic, semi-conductor, etc. Other forms of intermediate storage may also be employed, including delay line elements, and combined capacitive and inductive storage. Thus, referring to Figure 2, it will be seen that two rectifiers such as D6 and D7 may be coupled together by an inductor L, and capacitor C3 may then be connected from a center tap on inductor L, to ground. This arrangement of inductor L and capacitor C3 is in fact more efficient and requires less power than pure capacitor storage, and energy stored in an inductor such as L can be transferred to its associated capacitor with little loss. Such arrangements are typified in high Q resonant circuits and in conventional electrical delay lines. In this respect, therefore, the forms of intermediate storage shown may more accurately be called "passive" storage means.

Many variations of the instant invention will appear to those skilled in the art, in accordance with the principles discussed above, and these variations are all meant to fall within the scope of my invention as set forth in the appended claims.

Having thus described my invention, I claim:

1. A shifting register comprising a plurality of bistable pulse type amplifier stages, separate coupling means connecting the output of each of said stages to the input of a succeeding stage, each of said coupling means comprising first and second diodes connected in series with one another between the output of one such stage and the input of a succeeding such stage, passive storage means shunt connected to said coupling means at the junction point of said first and second diodes, each said passive storage means including a capacitor, first pulse means producing regularly occurring power pulses connected in series circuit with said first diode and said capacitor of each of said coupling means and a second pulse means producing regularly occurring blocking pulses connected in series circuit with said second diode and said capacitor of each of said coupling means, said first and second pulse means tending to render said first and second diodes conductive alternately during successive time periods whereby said capacitors may be charged through said first diodes when said first diodes are conductive, and said capacitors may be discharged through said second diodes when said second diodes are conductive.

2. The shifting register of claim 1 wherein each of said amplifier stages comprises a different magnetic amplifier including a magnetic core, said core exhibiting bistable states of magnetic remanance, a signal input winding and a power output winding on said core thereof, each of said power windings being interposed between said first pulse means and said first diode of said coupling means connected to the output of the same stage, and each of said input windings being interposed between said second pulse means and said second diode of said coupling means connected to the input of the same stage.

3. The shifting register of claim 2 wherein said power pulses exhibit recurrent potential excursions of a predetermined polarity and said blocking pulses exhibit recurrent potential excursions of the same polarity in coincidence with the excursions of said power pulses.

4. The combination of claim 3 in which each of said magnetic cores comprises a magnetic material exhibiting a substantially rectangular hysteresis loop.

5. A shifting register comprising a plurality of magnetic amplifiers connected in cascade, each of said amplifiers comprising a magnetic core exhibiting bistable states of magnetic remanence and having an input winding and an output winding thereon, a selective source of signal inputs coupled to the input winding of the first of said cascade connected amplifiers, a source of power pulses connected to one end of each of said output windings, separate coupling means between the other end of each of said output windings and one end of the input winding of the next succeeding amplifier in said cascade connected amplifiers, respectively, each of said coupling means comprising a first diode and a capacitive element connected in series circuit with each other and said other end of said respective output winding and a second diode connected between the junction of said first diode and said capacitive element and said one end of said input winding.

6. The combination of claim 5 including a source of regularly occurring blocking pulses coupled to the other end of each of said input windings.

7. A shifting register comprising a plurality of magnetic amplifier stages connected in cascade, each of said amplifier stages comprising a magnetic core having an input winding and an output winding thereon, each said core exhibiting bistable states of magnetic remanence, coupling means between one end of each of said output windings and one end of the input winding of the next succeeding amplifier stage, capacitive storage means connected to said coupling means, said coupling means including separately controllable charge and discharge circuits for said storage means, and first and second pulsing means connected in series with said charge and discharge circuits through said output and input windings respectively for rendering said circuits alternately operative, whereby said capacitive storage means may be charged during first regularly occurring time intervals by current flowing through the output winding of a given amplifier stage, and said storage means may thereafter be discharged during second regularly occurring time intervals through the input winding of the next succeeding amplifier.

8. The shifting register of claim 7 in which each of said amplifier stages comprises a pulse type complementing magnetic amplifier.

9. The shifting register of claim 7 in which said second pulsing means includes a source of regularly occurring blocking pulses coupled to the other end of the input windings of each of said amplifier stages.

10. The shifting register of claim 7 in which each of said amplifier stages comprises a pulse type non-complementing magnetic amplifier.

11. The shifting register of claim 9 in which said first pulsing means further includes a source of positive going power pulses coupled to the other end of the output winding of each of said amplifier stages, said blocking pulses being positive going in coincidence with said positive going power pulses.

12. A shifting register comprising a plurality of magnetic amplifiers connected in cascade, each of said amplifiers comprising a magnetic core having an input winding and an output winding thereon, each said core exhibiting bistable states of magnetic remanence, means connecting a source of regularly occurring power pulses to one end of each of said output windings, coupling means comprising a pair of series connected diodes connected between the other end of each of said output windings and one end of the input winding of the next succeeding magnetic amplifier, capacitive storage means connected to the common junction of each said pair of diodes, said source of power pulses being connected in a different series circuit with each of said output windings, said diode connected thereto and said capacitive means connected to that diode, and a source of regularly occurring blocking pulses connected to the other end of each of said input windings, said source of blocking pulses being connected in a different series circuit with each of said input windings said diode connected thereto and said capacitive means connected to that diode, said sources of power and blocking pulses producing like polarity excursions in coincidence with one another during spaced time intervals whereby said pair of diodes tend to be rendered conductive alternately during successive time intervals.

13. The combination of claim 12 in which each of said magnetic amplifiers comprises a pulse type complementing amplifier.

14. The combination of claim 12 in which each of said magnetic cores comprises a material exhibiting a substantially rectangular hysteresis loop.

References Cited in the file of this patent

UNITED STATES PATENTS

| | | |
|---|---|---|
| 2,652,501 | Wilson | Sept. 15, 1953 |
| 2,709,798 | Steagall | May 31, 1955 |

FOREIGN PATENTS

| | | |
|---|---|---|
| 730,165 | Great Britain | May 18, 1955 |
| 1,086,494 | France | Aug. 11, 1954 |

OTHER REFERENCES

"Magnetic Shift Register Using One Core Per Bit," appearing on pp. 38 to 42 of 1953 IRE National Convention Record, part 7.